Patented Mar. 27, 1923.

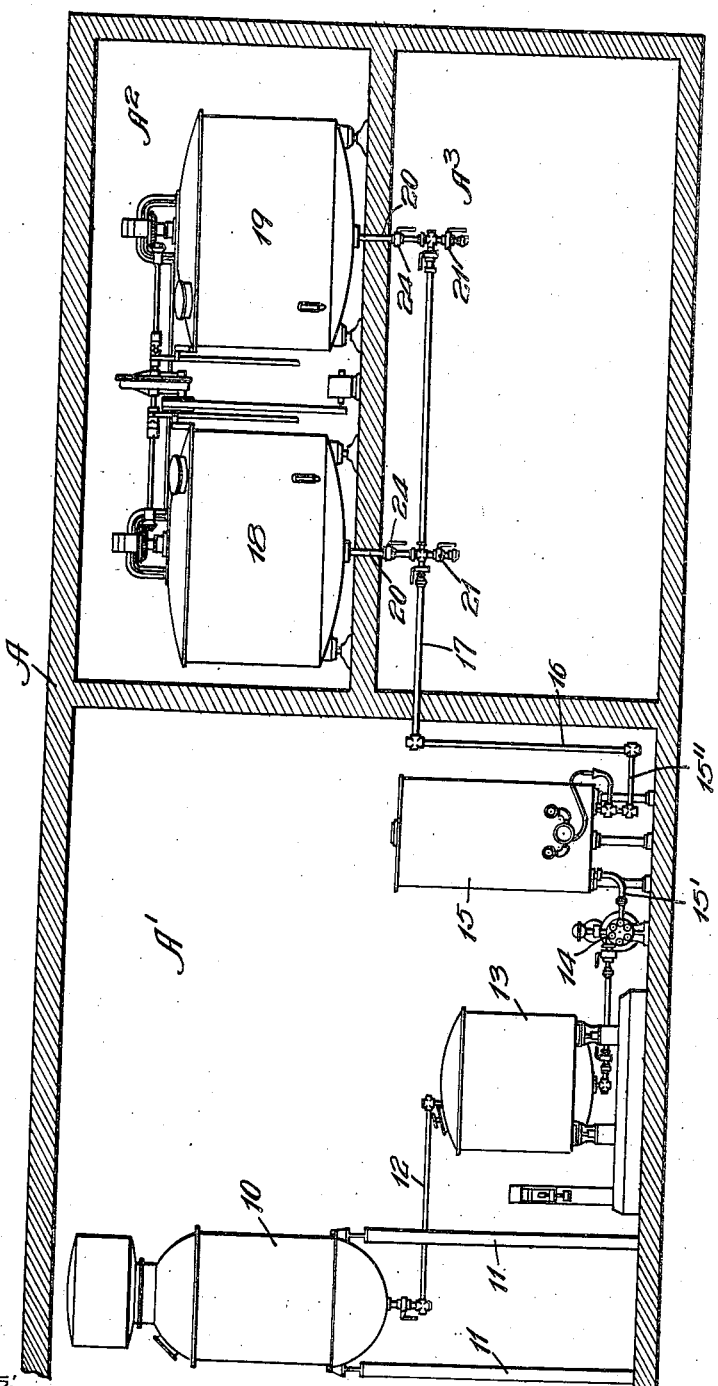

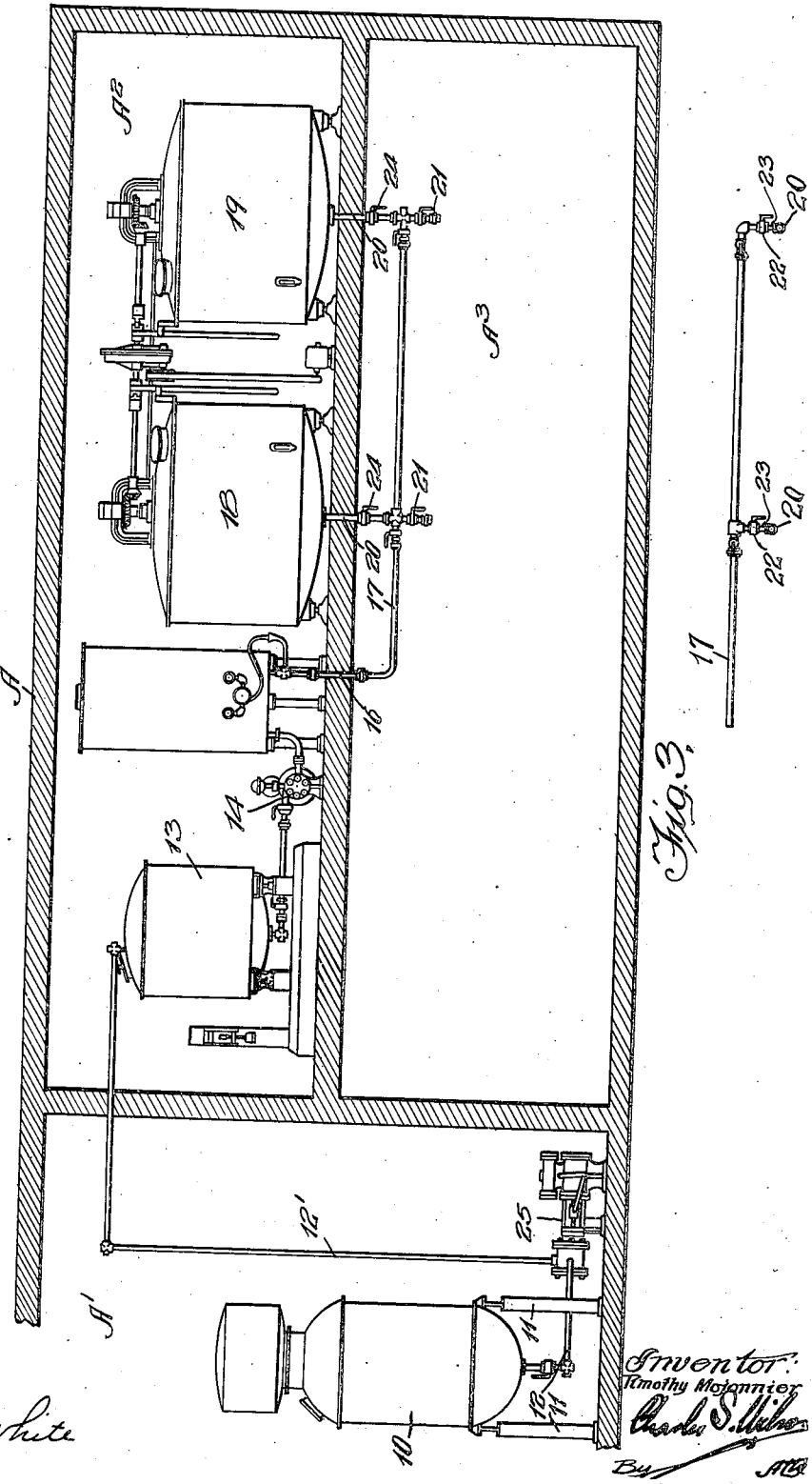

1,449,688

UNITED STATES PATENT OFFICE.

TIMOTHY MOJONNIER, OF OAK PARK, ILLINOIS, ASSIGNOR TO MOJONNIER BROS. CO., OF CHICAGO, ILLINOIS, A CORPORATION OF ILLINOIS.

METHOD FOR THE MANUFACTURE OF SWEETENED CONDENSED MILK.

Application filed March 1, 1920. Serial No. 362,401.

*To all whom it may concern:*

Be it known that I, TIMOTHY MOJONNIER, a citizen of the United States, and a resident of Oak Park, in the county of Cook and the State of Illinois, have invented certain new and useful Improvements in Methods for the Manufacture of Sweetened Condensed Milk, of which the following is a specification.

This invention relates to a method and apparatus for the manufacture of sweetened condensed milk, whereby the milk is unexposed to air from the time it is delivered to the vacuum pan until it is canned, and has for one of its objects the accurate and standardized control of the chemical and physical properties and characteristics of the product.

As sweetened condensed milk contains sugar, which, in the finished product, should be reduced to a minimum crystallization to produce a smooth product, it is the purpose of the present method and apparatus to so control the crystallization of the sugar that the product will be smooth to the taste and the grit (sugar crystals) will be reduced to a minimum.

It is furthermore the object of the present invention to promote greater accuracy in filling the finished product into cans, through the control of the temperature and composition thereof: to eliminate and reduce Sunday, holiday, and slack season work and to reduce labor requirements generally, by providing for the handling of seven days' receipts in such a manner that the filling may be done in six days; to provide for the handling of batches of different quantities with equal facility; to reduce to a minimum if not entirely eliminate, loss of the condensed product; to promote and accomplish uniform viscosity, color and flavor, irrespective of the varying sources of the milk before evaporation, by the bringing a number of batches to a common standard by comixing and unified handling, and to make possible the thorough cleansing and sterilizing of the apparatus.

With the above and other objects in view, as will be apparent, the present invention consists in the process, method and steps thereof, all as hereinafter more fully described and claimed and capable of being carried out by the apparatus illustrated in the accompanying drawings wherein:—

Fig. 1. is a section illustrating, more or less diagrammatically the arrangement of the apparatus:

Fig. 2. is a similar view illustrating a modification of the arrangement: and

Fig. 3. is a diagrammatic view of the piping connections for the agitators.

For a ready and clear understanding of the present invention, it is desirable that an at least general conception be had of the art which preceded it and the sources of milk upon which the canner is dependent. The canner of milk receives his milk from a large variety of sources from producers and as a consequence his raw material of necessity varies as to its fat and solid content, making it incumbent upon the canner to convert these various quantities, of different composition and quality, into a standard uniform product. The present invention is designed to accomplish this economically and efficiently to create a product of uniform viscosity, color and flavor, with uniformly minute crystals of sugar, resulting in a smooth article for canning.

In general there have been heretofore three methods of preparing sweetened condensd milk for canning, all of which up to a certain point are identical but beyond that point differ to a more or less wide extent. The fresh milk received by the canner is thoroughly mixed with sugar and then placed in a vacuum pan where a portion of the water is evaporated from the milk. This naturally creates an excess of milk sugar in the evaporated or condensed milk, which if left to itself will crystallize in relatively large crystals producing a gritty milk, decidedly rough to the taste. All of the preceding methods are alike up to the point of removing the milk from the pan and for that matter they are also identical to the present method up to that point. The method of handling the evaporated or condensed milk after it leaves the pan differs in all of the prior methods and the present method differs from each and all of the others from this same point.

The first of the three prior methods delivers the milk from the vacuum pan to ten (10) gallon cans, in which the milk is cooled and receives such agitation as can be readily given it. After the cooling and supposed agitation is completed the contents of the cans are emptied into the feeding tank of the filling machine.

The second of the three prior methods consists in delivering the milk from the vacuum pan to the tank having a rotary coil mounted therein through which the cooling agent circulates. This coil rotates through the milk and imparts to the latter the only agitation that it receives.

The milk is then fed directly from the aforesaid cooling tank to the fillers.

The third of these three prior methods consists in pumping the milk from the pan through the double pipe tubular cooler, without agitation and delivering to the feeding tank of the filler or fillers.

On the whole the the three principal prior methods are very unsatisfactory for a number of reasons, among the most common of which is the exposing of the milk to contamination by the air, to which it is very susceptible; the great amount of crystallization, usually large crystals, producing gritty milk that is not smooth to the taste; the inability to produce uniform viscosity, color and flavor, or to control the temperature and composition, or accuracy in filling the cans; the necessity of filling seven days a week and operating the plant on Sundays and holidays; the inefficiency in handling batches of varying size; the waste caused by labor now necessarily idle between batches; and the inability to sterilize and clean the apparatus without great loss of milk. These are a few of the greater objections to the prior methods, all of which are completely overcome by the present invention, both method and apparatus.

Prior to discussing the present method the general apparatus designed to carry it out will be described. Referring more particularly to Figure 1 of the drawings "A" designates generally the building or plant having three compartments or rooms $A^1$, $A^2$, and $A^3$. The first of these rooms $A^1$ may, in the arrangement shown in Figure 1 be termed the vacuum cooling room; the second $A^2$, may be termed an agitator room; and the third $A^3$, may be called the filling room. In the vacuum and cooling room $A^1$ is a vacuum pan 10 elevated upon the supports 11 so that its contents, after condensation, may plow by gravity through the pipe 12 to the weigh tank 13. From the weigh tank 13 the milk is removed and pumped by the pump 14 to and through the cooler 15, from which it is taken by the pipe 16 extending upwardly adjacent the walls separating the compartments $A^2$ and $A^3$ from the compartment $A^1$. At its upper end the pipe 16 communicates with a horizontal pipe 17, which pierces the wall aforesaid and extends through the compartment $A^3$ just below the ceiling thereof. The pressure on the milk created by the pump 14 is sufficient to force it through the cooler 15 pipes 16 and 17 to the agitators 18 and 19 in the compartment $A^2$ as will be described. Regarding the cooler 15 it will be observed that the inlet pipe 15 and the outlet pipe $15^2$ the latter connecting with the pipe 16, are diametrically disposed one to the other, so that the milk passes through said cooler 15 to its top and then returns to the bottom thereof whereby the milk is acted upon by the cooling agent twice the length of time, or more often if desired, than it would if it merely passed through the cooler once and was discharged at the top.

In the agitating room $A^2$ are two independently operable agitators 18 and 19, that is to say when the agitator 18 is operating the agitator 19 is stationary and vice versa. Each agitator tank has a pipe 20 communicating with the interior of the tank through the bottom thereof and serves both as an inlet and an outlet to the said tanks. At the lower ends the pipes 20 are provided with the valves 21 and are arranged to connect directly to the filling machine or machines as the case may be. Medially of their lengths the pipes 20 are connected by horizontal pipes to the pipe 17 in such a manner that flow may be established from the pipe 17 through the pipe 20 to the agitator, or from the agitator through the pipe 20 to the filling machine. This accomplished by the valves 22 in the horizontal pipes 23 (Fig. 3) extending from the pipes 20 to the pipe 17, for by closing a valve 22 a communication can be had between the pipes 17 and 20, whereas if the valve 22 is open and the valve 21 closed flow is established from the pipe 17 to the agitator by way of the pipes 20 and 23. Valves 24 are provided in the pipes 20, which when closed, effectually stop all flow through these pipes 20. From the foregoing it will be seen that by closing the valve 22 of the agitator 18 and opening the valves 21 and 24 this agitator may be emptied through the pipe 20 into the filling machines and at the same time the valve 24 and 22 may be opened and the valve 21 closed of the agitator 19 to fill the latter from the pipe 17. This procedure may be reversed by the obvious manipulating of the valves so that the agitator 19 may be emptied while the agitator 18 is being filled.

With regard to the arrangement disclosed in Fig. 2 the relative positions of the various pieces of apparatus is much the same as in the form set forth in Fig. 1. Here the vacuum pan 10 is in the compartment $A^1$ mounted upon supports 11, not so high as the support 11 in Fig. 1, and the milk is withdrawn from the pan 10 through the pipe 12 and forced upwardly through the pipe 12¹ by the pump 25 in the compartment A¹. The pipe 12¹ pierces the dividing wall and enters the compartment A² where it communicates with the weigh tank 13. A pump 17 removes the milk from the weigh tank 13 and circulates it through the cooler 15 and pipe 16 to the pipe 17 in the compartment A³. The agitators 18 and 19 are located in the chamber A², as in Fig. 1. and the piping arrangement between the pipe 17 and the agitators 18 and 19 are the same as in Fig. 1. In fact the difference between these two forms are that in Fig. 1. the cooler 15 is below the pan 10 and in Fig. 2. it is above the pan; furthermore in Fig. 1, a single pump is used while in Fig. 2, two are necessary.

The method constituting the present invention and carried out by the apparatus will now be described in detail. The fresh milk as it is received is mixed with the requisite amount of sugar after which it is delivered to the vacuum pan 10 where a part of the water therein is removed therefrom by evaporation. After evaporation the milk is passed to the weigh tank 13, from which it circulates through the cooler 15 where it is accurately brought to the desired temperature, which may be definitely determined by the manipulation of the cooler.

When the circulation through the cooler 15 is complete the milk is fed to one of the agitators 18 or 19, where it receives a thorough and continuous agitation until the tank is filled, after which the flow is directed to the remaining agitator, and the one first filled is emptied into the fillers or their tanks. Thus one agitator is constantly being filled while the other is being emptied and vice versa.

By this method the condensed milk is cooled in one unit and the crystallization and agitation takes place in another, whereby the temperature is under constant control. Furthermore as the agitation takes place during crystallization and during the entire time the agitator is being filled, the size of the crystals or grit is reduced to a minimum size to produce a milk smooth to the taste thus is the crystallization controlled.

It is apparent from the foregoing and the drawings that, during the entire process of condensation, the milk is never once exposed to the contaminating influence of the air.

With this method by providing a continuous flow and elimination of manually handling the milk after it is placed in the pan 10, the number of men required is very materially reduced. Additional saving of labor is accomplished by reducing or even discontinuing the operation of the filling room force on Sundays and holidays, for the milk received on these days is stored in the agitators after having been condensed and can be filled into the cans on the normal working days.

Heretofore each batch has been to a great extent handled individually, thus causing delays, idle men waiting for new batches, and varying standards of viscosity, color and flavor. In the present method the batches are mixed together, thus producing uniform viscosity, color and flavor.

What is claimed is:—

1. A method of manufacturing sweetened condensed milk consisting in placing the fresh milk mixed with sugar in a vacuum pan, cooling in one unit during a continual flow of the product, and crystallizing and mixing in another without exposing to the air.

2. A method of manufacturing sweetened condensed milk consisting in condensing the fresh milk mixed with sugar in a vacuum pan, cooling in one unit, crystallizing and mixing in one of a number of other units, and filling from the remaining of said units, all without exposing to the air.

3. A method of manufacturing sweetened condensed milk consisting in condensing fresh milk mixed with sugar in a vacuum pan, cooling the condensed product in one unit, and crystallizing in one of a number of other units, and at the same time filling from the remaining of said other units, all without exposure to air and in a continuing operation.

4. A method of manufacturing sweetened condensed milk consisting in condensing fresh milk mixed with sugar, cooling the condensed product in a continuous flow, and subsequently breaking up the crystals therein by agitation during crystallization.

TIMOTHY MOJONNIER.